United States Patent [19]
Seiferth et al.

[15] 3,647,485
[45] Mar. 7, 1972

[54] PACKAGE AND METHOD OF MAKING SAME

[72] Inventors: Oscar E. Seiferth; Robert L. Goller; Paul E. Grindrod, all of Madison; Harry L. Radloff, Sun Prairie, all of Wis.

[73] Assignee: Oscar Mayer & Co., Inc., Chicago, Ill.

[22] Filed: Aug. 21, 1968

[21] Appl. No.: 754,361

[52] U.S. Cl. ..........................99/174, 99/171 LP, 156/306, 161/252
[51] Int. Cl. .......................................................B65b 25/06
[58] Field of Search ....................99/171, 174, 175, 171 LP; 161/252, 254; 156/306; 229/51, 51 WB; 206/46 F; 117/138.8 U

[56] References Cited

UNITED STATES PATENTS

| | | | |
|---|---|---|---|
| 2,834,686 | 5/1958 | Reuman | 99/174 X |
| 2,919,059 | 12/1959 | Sporka | 99/171 UX |
| 3,228,168 | 1/1966 | Grindrod | 99/174 X |
| 3,330,670 | 7/1967 | Grindrod | 99/174 X |
| 3,340,091 | 9/1967 | Zweib | 161/254 X |
| 3,454,158 | 7/1969 | Tigner | 99/174 X |
| 3,454,210 | 7/1969 | Spiegel | 161/252 X |
| 3,467,296 | 9/1969 | Anderson | 99/171 X |
| 3,496,061 | 2/1970 | Freshour | 161/254 |
| 3,131,069 | 4/1964 | Goller | 99/174 |
| 3,322,614 | 5/1967 | Seiferth | 161/254 |
| 3,338,739 | 8/1967 | Rees | 117/138.8 U |

OTHER PUBLICATIONS

Gulf Publication, Gulf 6726, " Poly–ETU" Polyethylene

Primary Examiner—Frank W. Lutter
Assistant Examiner—Robert Halper
Attorney—Greist, Lockwood, Greenawalt & Dewey

[57] ABSTRACT

A hermetically sealed package and method of making the same which package includes a breakaway or peelable seal formed between an ethylene-polar monomer copolymer film or coating material, such as, ethylene-vinyl acetate, and a thermoplastic film, such as, polyvinylidene chloride. Preferably, during seal formation, the seal interface is heated to a temperature between the melt temperatures of the film materials which make up the seal to provide improved sealing without destroying the breakaway property or peelability of the seal so formed.

17 Claims, 19 Drawing Figures

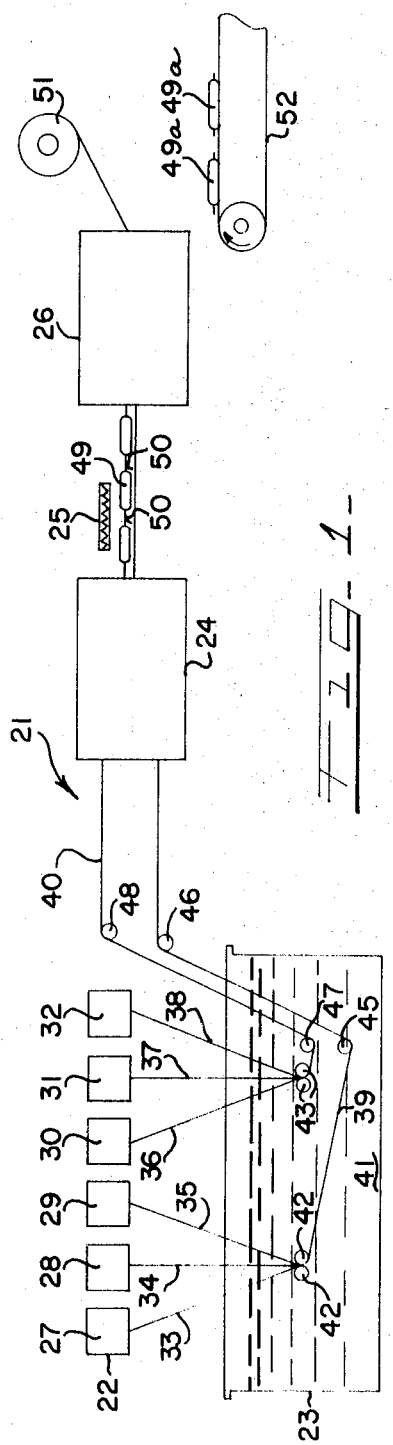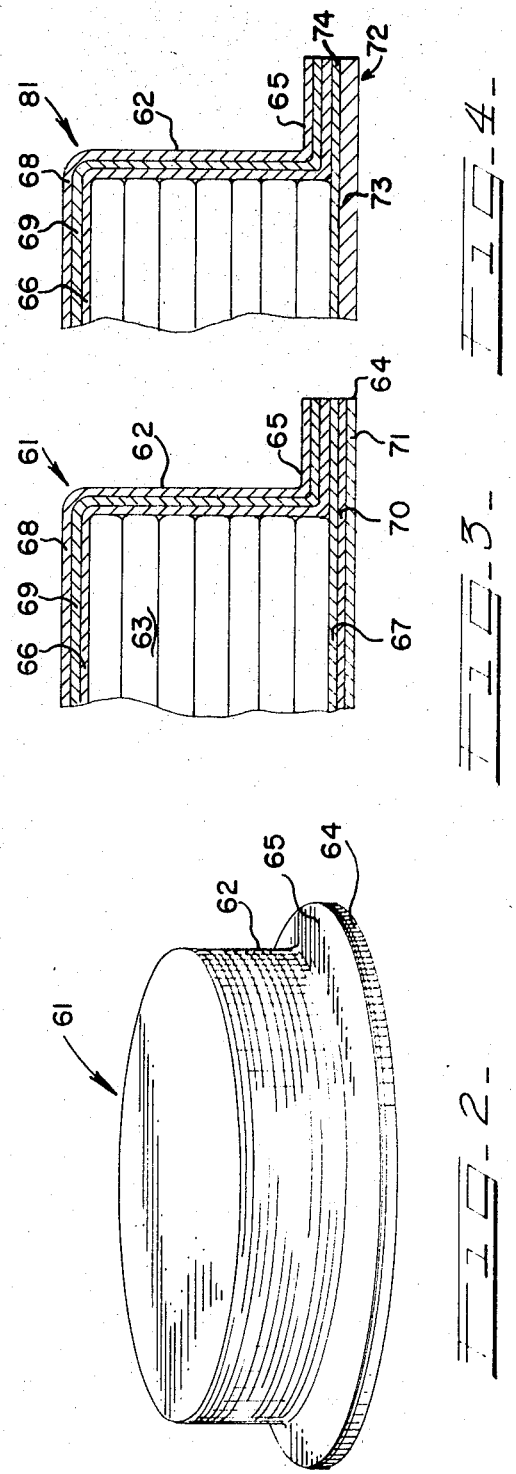

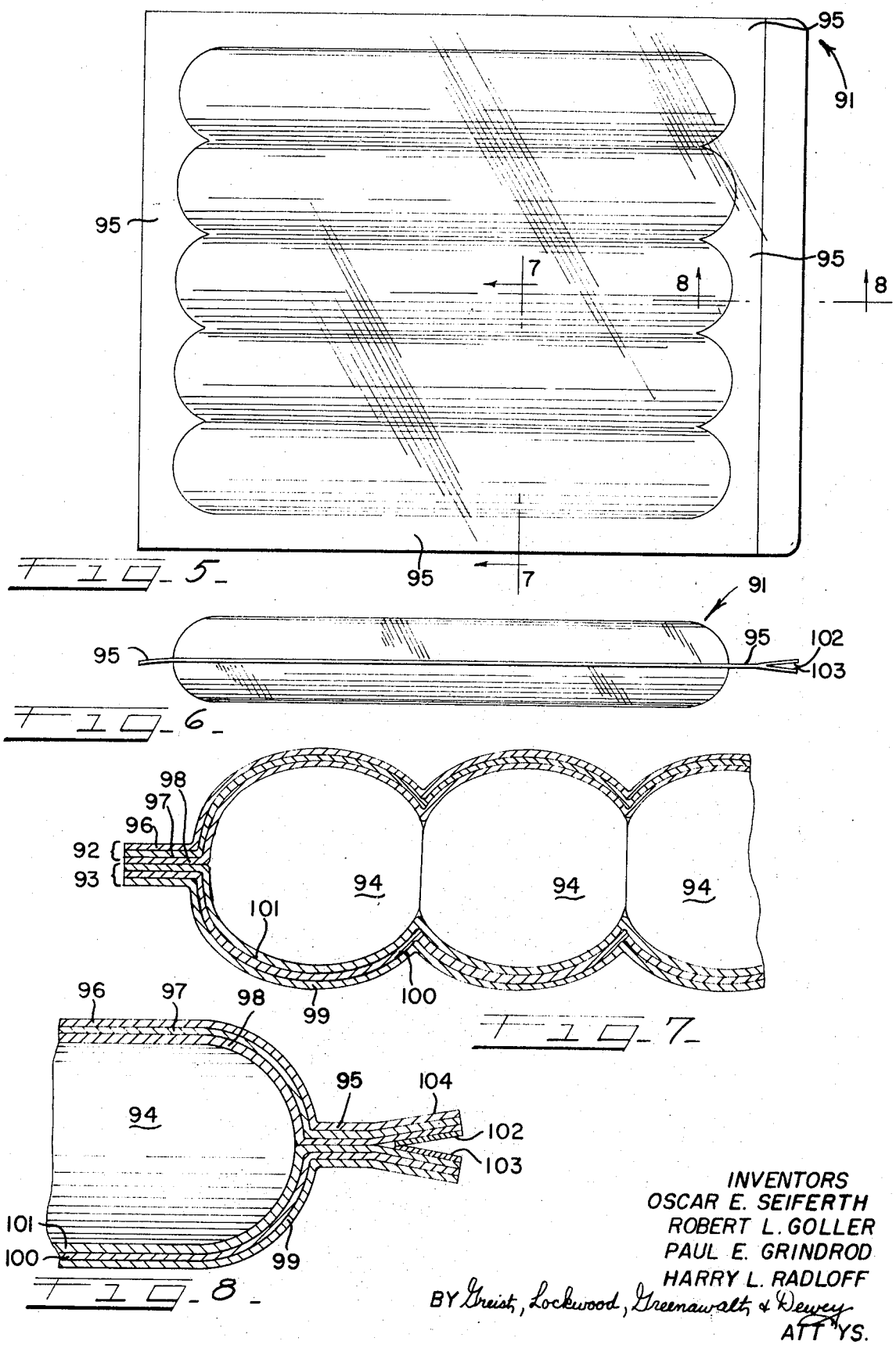

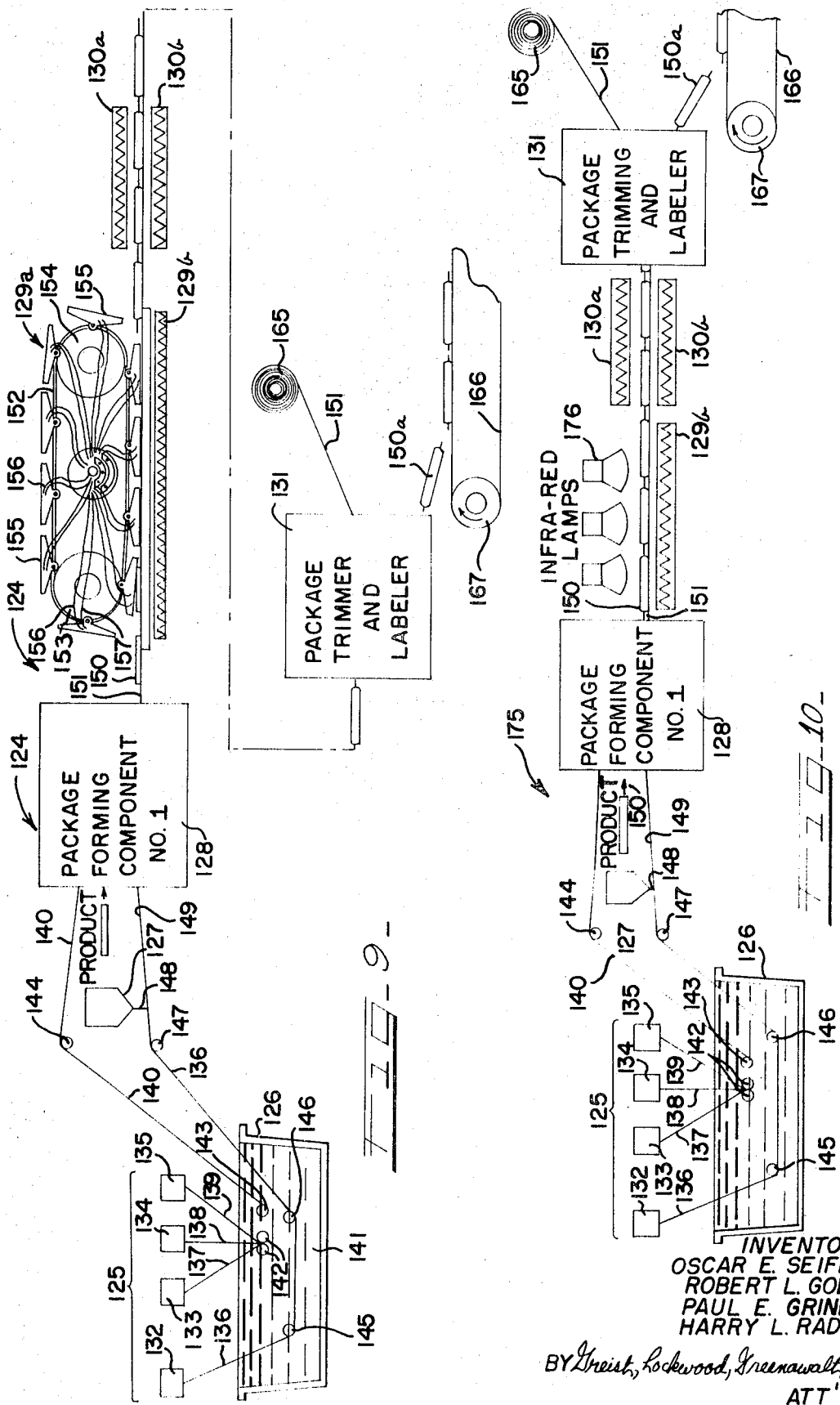

INVENTORS
OSCAR E. SEIFERTH
ROBERT L. GOLLER
PAUL E. GRINDROD
HARRY L. RADLOFF

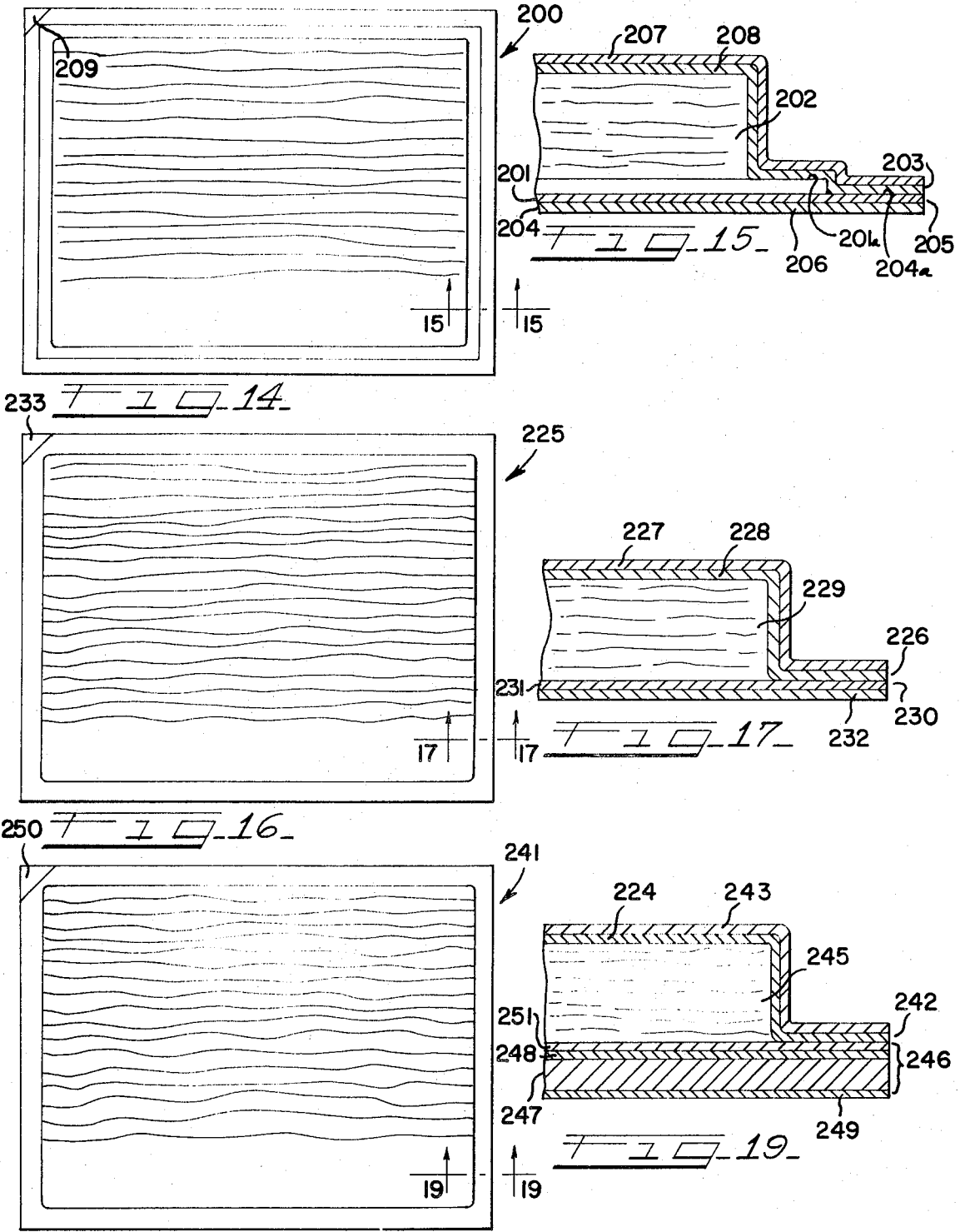

PACKAGE AND METHOD OF MAKING SAME

BACKGROUND AND DESCRIPTION OF INVENTION

The present invention generally relates to improved packages and methods of making the same which packages are characterized by hermetic seals that can be readily separated when access to the product is desired. More particularly, this invention is concerned with a new and improved package having either a hermetic breakaway or peelable seal formed between an ethylene-polar monomer copolymer film or coating and a thermoplastic film. Desirably, controlled amounts of heat, below the melt temperatures of the film materials constituting the package, can be applied to the seal area at the time of seal formation to improve the tenacity of the seal so formed without destroying its breakaway property or peelability. In a preferred embodiment of the present invention, the hermetic breakaway or peelable seal is formed between an ethylene-vinyl acetate copolymer (hereinafter referred to as EVA) film or coating and a polyvinylidene chloride film which is contacted with the EVA coating or film while the polyvinylidene chloride film is in an amorphous supercooled state.

As used in the specification, the term "breakaway seal" is used to define a seal wherein, at the time the seal is broken, either of the film materials which make up the seal separate either partially or entirely from the substrates to which they were respectively applied. The term "peelable seal" is used to denote a seal wherein both of the film materials which make up the seal, on seal separation, remain intact on the substrates to which they were respectively applied.

In accordance with the present invention, a new and improved package is provided with a peelable or breakaway seal without the use of a plasticizer or pressure sensitive adhesive. This seal is formed between an ethylene-polar monomer copolymer film or coating wherein the polar monomer content ranges from approximately 10 to 40 percent by weight and a thermoplastic film. While ethylene-vinyl acetate copolymer is a preferred film material for the practice of the present invention, other ethylene-polar monomer copolymer film materials such as, for example, ethylene-isobutyl acrylate copolymer and ethylene-ethyl acrylate copolymer can also be adhered to a thermoplastic film to provide the advantageous breakaway and peelable seals of the present invention.

Oxygen barrier films can be advantageously combined with the ethylene-polar monomer copolymer films of the present invention for packaging food and other perishable products. In this regard, the preferred oxygen barrier films are transparent films which have an oxygen transmission rate of from 0 to 10 cubic cm., per 100 square inches, per 24 hours, per mil thickness, at 77° F. and 760 mm. Hg.

An important aspect of the present invention involves the discovery that the tenacity of a seal formed between an ethylene-polar monomer copolymer film or coating and a thermoplastic film can be substantially improved by heating the seal interface, at the time of seal formation, to a temperature which advantageously promotes increased seal tenacity without adversely affecting the ease with which such seals can be broken when access is desired. Typical temperatures which can be used to obtain the advantageous improved hermetic seals with these films generally run from approximately 80° to 200° F. The use of such a heating step is readily distinguishable from conventional heat seal techniques in that with conventional heat seal techniques it is necessary to heat at least one of the materials at the seal interface to a temperature above its melting point in order to induce fusing thereof to the other material making up the heat seal. In accordance with the low temperature sealing techniques of the present invention, the maximum temperatures employed are below the melt temperatures of the film materials which make up the package and form the seal. It has been found that as the polar monomer content of the ethylene-polar monomer copolymer coating or film is lowered, a corresponding increase in temperature is required in order to produce a seal of equivalent tenacity.

The improved packages of the present invention exhibit significant advantages in that they are generally characterized by a seal which closely conforms to the shape of the packaged product. This product-conforming seal has a number of significant advantages. For example, the unsightly appearance produced by the free movement of water and product juices loosely contained in many conventional packages is avoided. In addition, the present invention also provides a package with a permanently positioned product without any loose film thereby substantially minimizing damage to the package during shipment which can result in contamination of the product. Furthermore, these packages provide a maximum seal area for a given product particularly where such product is of irregular shape thereby providing the maximum seal area afforded by a package of a given size and likewise minimizing the amount of residual oxygen present in such package. For these reasons, and others, the improved packages of the present invention are particularly suitable for the packaging of food products such as wieners, bacon, sliced luncheon meats, chops, cheese and the like.

It is, therefore, an important object of the present invention to provide an improved package characterized by an improved hermetic peelable or breakaway seal which can be readily and easily separated when access to the contents of said package is desired.

An object of the present invention is to provide an improved package which is particularly suitable for packaging of food products which package includes an improved hermetic peelable or breakaway seal formed without the use of a plasticizer or pressure-sensitive adhesive.

Another object of the present invention is to provide a new and improved package having an improved peelable or breakaway seal formed between an ethylene-polar monomer copolymer film or coating and a thermoplastic film.

Another object of the present invention is to provide a new and improved package having a hermetic peelable or breakaway seal formed between an ethylene-polar monomer copolymer film or coating and a thermoplastic film which seal was formed by placing such copolymer film or coating and thermoplastic film in adherent contact with each other while having simultaneously heated the seal interface formed thereby to a temperature sufficiently high so as to provide improved seal tenacity but which temperature was below the melt temperature of the copolymer film or coating and the thermoplastic film.

Another object of the present invention is to provide a new and improved hermetic package having a peelable or breakaway seal formed between a pair of films in adherent contact with each other wherein one of said films is composed of an ethylene-polar monomer copolymer film having a polar monomer content of from approximately 10 to 40 percent by weight.

Another object of the present invention is to provide a new and improved hermetic package having a peelable or breakaway seal formed between a pair of films in adherent contact with each other wherein one of said films is composed of an EVA film having a vinyl acetate content of from approximately 10 to 40 percent by weight.

Another object of the present invention is to provide a new and improved hermetic package having a peelable or breakaway seal formed between an ethylene-polar monomer coating and a thermoplastic film or coating wherein said copolymer coating has a polar monomer content of from approximately 10 to 40 percent by weight.

Another object of the present invention is to provide a new and improved hermetic package having a peelable or breakaway seal formed between an EVA coating and a thermoplastic film or coating wherein said EVA coating has a vinyl acetate content of from approximately 10 to 40 percent by weight.

Another object of the present invention is to provide a new and improved package having a hermetic peelable or breakaway seal formed between an EVA film or coating and a flexible polyvinylidene chloride film.

Another object of the present invention is to provide a method of making a package having a hermetic breakaway or peelable seal formed between a pair of film materials which can be readily separated when access to the contents of said package is desired, such hermetic breakaway or peelable seal being formed by merely contacting an ethylene-polar monomer copolymer film having a polar monomer content of approximately 10 to 40 percent by weight with a thermoplastic film.

Another object of the present invention is to provide a method of making a package having a hermetic peelable or breakaway seal formed between an ethylene-polar monomer copolymer coating or film and a polyvinylidene chloride film which method involves the step of contacting the copolymer coating or film with the polyvinylidene chloride film while the latter film is in an amorphous or "supercooled" state.

Another object of the present invention is to provide a method of making a package having a hermetic peelable or breakaway seal formed between an EVA coating or film and a polyvinylidene chloride film which method involves the step of contacting the EVA coating or film with the polyvinylidene chloride film while the latter film is in an amorphous or "supercooled" state.

Another object of the present invention is to provide a method of making an improved package having a hermetic peelable or breakaway seal formed between an ethylene-polar monomer copolymer film and a thermoplastic film which method involves the steps of contacting the copolymer film or coating with the thermoplastic film at the seal area while simultaneously heating the interface to a temperature which will induce the formation of a seal of improved tenacity without destroying the peelable or breakaway characteristics thereof which maximum temperature is less than the melt temperatures of either of said materials at the seal interface.

Other and further objects of the present invention will be apparent from the following detailed description thereof taken in conjunction with the accompanying drawings wherein:

FIG. 1 is a diagrammatic illustration of a procedure which can be followed in making a laminated film package embodying principles of the present invention;

FIG. 2 is a perspective view of a package made in accordance with the present invention;

FIG. 3 is a fragmentary enlarged sectional view of a portion of the seal area of the package shown in FIG. 2;

FIG. 4 is a fragmentary enlarged sectional view of the portion of the seal area, similar to that shown in FIG. 3, but of a modified package from that shown in FIG. 2;

FIG. 5 is a schematic plan view of a wiener package embodying principles of the present invention;

FIG. 6 is a side elevational view of the package shown in FIG. 5;

FIG. 7 is an enlarged fragmentary sectional view of the package shown in FIG. 5 taken along the line 7—7 therein;

FIG. 8 is an enlarged fragmentary sectional view of the package shown in FIG. 5 taken along the line 8—8 therein;

FIG. 9 is a diagrammatic illustration of a procedure which can be followed in making a package embodying principles of the present invention which procedure includes one form of low temperature heating to enhance the seal formation in accordance with the present invention;

FIG. 10 is a diagrammatic illustration of another procedure which can be followed in making a film package embodying the present invention which procedure includes a modified heating step for producing improved seals;

FIG. 14 is a schematic plan view of one form of bacon package embodying principles of the present invention;

FIG. 15 is a fragmentary enlarged sectional view of the package shown in FIG. 14 taken along the line 15—15 therein;

FIG. 16 is a schematic plan view of a modified form of bacon package embodying principles of the present invention;

FIG. 17 is an enlarged fragmentary sectional view of the package shown in FIG. 16 taken along the line 17—17 therein;

FIG. 18 is a schematic plan view of a further modified form of bacon package embodying principles of the present invention; and FIG. 19 is an enlarged fragmentary sectional view of the package shown in FIG. 18 taken along the line 19—19 therein.

Figure 11:
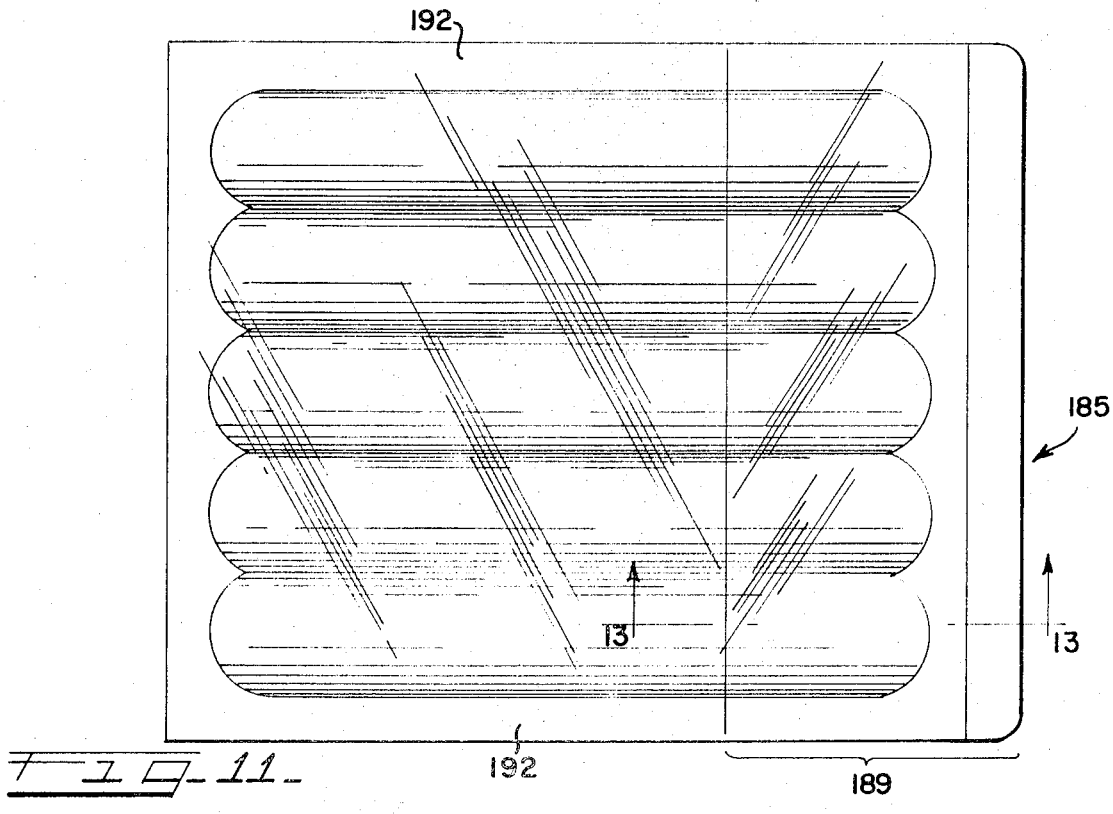
FIG. 11 is a schematic plan view of a modified wiener-type package embodying principles of the present invention.

In the detailed description of certain preferred embodiments of the present invention set out below, it will be noted that these packages generally include one or more laminae of a polyvinylidene chloride film. These polyvinylidene chloride films are not essential to the present invention in that suitable peelable or breakaway seals can be formed between ethylene-polar monomer copolymer films or coatings and other thermoplastic materials. There are, however, certain unique properties of polyvinylidene chloride films which, by reason of their own individual characteristics and cooperative characteristics exhibited with ethylene-polar monomer copolymer films and coatings, make these films particularly suitable for use in the improved packages of the present invention.

Polyvinylidene chloride films, for example, exhibit a so-called "supercooled" or amorphous state that can be advantageously utilized to enable film laminations which include the same to be readily formed about a product to be packaged. The properties and the method of inducing this amorphous condition are fully described in coowned U.S. Letters Pat. Nos. 3,083,106, 3,189,505 and 3,131,069, among others. In general, these unique properties can be induced, following extrusion, by immediately cooling the films such as by passing them through a water bath maintained at a temperature of from approximately 35° to 100° F. This amorphous condition can then be maintained until the combination of time and temperature causes crystallization.

While in this supercooled state, the polyvinylidene chloride film can be drawn about a product to be packaged to form a surface conforming package which is not characterized by folds or pleats that can establish potential leakage areas. Controlled stretching or forming of the film while in a supercooled state can be practiced without accompanying crystallization of the film to an extent that the supercooled properties are retained in order to make full utilization of these unique properties.

An important discovery which has been employed in the making of a preferred embodiment of the present invention involves the finding that while in an amorphous condition and without substantial crystallization occurring, a flexible polyvinylidene chloride film will form a particularly effective hermetic peelable or breakaway seal with an ethylene-polar monomer copolymer film or coating having a polar monomer content of from approximately 10 to 40 percent by weight by merely placing these films in adherent contact with each other. This hermetic seal, however, can be further improved by the application of the low-temperature heating techniques previously referred to which will be described in greater detail hereinafter.

The ethylene-polar monomer copolymer films and coatings included within the present invention are those copolymers of ethylene and a polar monomer wherein the polar monomer content ranges from approximately 10 to 40 percent by weight. In this regard, the term polar monomer is used herein to denote those chemical substituents or groups which, when copolymerized with ethylene, provide a resultant copolymer that exhibits polar characteristics to a degree such that the copolymer is susceptible to adhesion with other thermoplastic films. The preferred copolymer film material of the present invention is ethylene-vinyl acetate. Other suitable copolymers of ethylene and polar monomers, however, may be advantageously used to provide the breakaway or peelable seals with thermoplastic films of the present invention. By way of example only, these other copolymers include the copolymer of ethylene and isobutyl acrylate and the copolymer of ethylene and ethyl acrylate as well as copolymers of ethylene and polar monomers which exhibit properties and characteristics similar to these specific film materials. For purposes of illustration, the following embodiments of the present invention will be described with reference to the preferred copolymer film material, namely, EVA. It is to be understood, however, that the present invention is not limited to EVA copolymers but rather encompasses the equivalent ethylene-polar monomer copolymer films mentioned above.

Referring to the drawings, and with particular reference to FIG. 1, the numeral 21 generally designates a continuous film and packaging forming apparatus which can be employed in the manufacture of packages embodying principles of the present invention. As is shown, apparatus 21 generally includes a film forming component 22, supercooling bath 23, package forming component 24, heater 25 and combination labeling and trimming unit 26. For purposes of illustration, apparatus 21 will generally be described in connection with the forming of packages made from two three-ply film laminations, where each of such laminations includes at least one lamina of a polyvinylidene chloride film.

As is shown, film forming component 22 includes a plurality of film extruders, diagrammatically illustrated and respectively designated by the reference numerals 27-32. Film extruders 27-32 extrude films 33-38, respectively, each of which exhibits properties and characteristics which are specifically adapted to meet the requirements of the package to be ultimately formed. For example, in the packaging of food products which are subject to deterioration by contact with oxygen, film extruders 27 and 32 could be supplied with a suitable oxygen barrier film forming resin, such as, for example, a polyvinylidene chloride film having a composition of approximately 85 percent vinylidene chloride and 15 percent vinyl chloride or 90 percent vinylidene chloride and 10 percent vinyl chloride. As is shown, films 33, 34 and 35 form the bottom film lamination 39. In accordance with the present invention, inner lamina 35 will preferably be formed of a flexible polyvinylidene chloride film generally having a lower vinylidene chloride content, such as, for example, a film formed from a resin having a 68 percent vinylidene chloride and 32 percent vinyl chloride content. Bonding of the flexible polyvinylidene chloride inner lamina 35 to the outer lamina 33 is accomplished through the use of intermediate lamina 34 composed of an EVA film having a vinyl acetate content of at least 30 percent by weight. By employing such an intermediate film lamina 34 between the two polyvinylidene chloride laminae 33 and 35, improved strength and flexibility are provided to the film lamination 39 resulting in such film lamination exhibiting substantially increased impact strength as well as improved low temperature properties. Other suitable film materials for the intermediate lamina 34 include chlorinated polyethylene and compounded polyvinyl chloride and polyvinyl chloride-vinyl acetate copolymers.

The upper film lamination 40 is a three-ply film lamination having an inner lamina 36, intermediate lamina 37 and outer lamina 38. As was previously noted, outer lamina 38 can be formed of a suitable oxygen barrier film such as, for example, a polyvinylidene chloride film having a vinylidene chloride content of approximately 85 percent and a vinyl chloride content of approximately 15 percent. In accordance with a preferred embodiment of the present invention, inner lamina 36 is composed of an EVA film having a vinyl acetate content of from approximately 10 to 40 percent by weight. EVA films having a vinyl acetate content of from 15 to 20 percent by weight are particularly suitable for forming the improved breakaway and peelable seals with a polyvinylidene chloride film having a 68 percent vinylidene chloride, 32 percent vinyl chloride content such as inner film lamina 35. Intermediate lamina 37 can be composed of a suitable EVA film having a vinyl acetate content of at least 30 percent. Such intermediate film lamina imparts additional strength and flexibility to the film lamination as well as providing opposed surfaces to which the inner EVA film 36 and outer polyvinylidene chloride film 38 bond.

Films 33-38, upon being extruded, are immediately introduced into a controlled temperature water bath 41 in the supercooling unit 23. Water bath 41 is preferably maintained at a temperature of from approximately 35° to 100° F. When reduced to this temperature, the polyvinylidene chloride films exhibit the previously mentioned "supercooled" or noncrystalline properties which are maintained until a combination of time and temperature conditions produce crystallization therein. While in this supercooled state, the polyvinylidene chloride can be readily formed about a product to produce a surface conforming package therefor. In accordance with the present invention, the amorphous polyvinylidene chloride film 35, when contacted with the EVA film lamina 36, produces a hermetic peelable seal therewith. The extrusion of the EVA or equivalent copolymer film into the supercooling bath while not essential in order to effect an amorphous or noncrystalline condition therein, is provided in order to enable the EVA or equivalent copolymer film to be laminated with the supercooled polyvinylidene chloride without thereby causing premature crystallization of the supercooled polyvinylidene chloride film.

As is shown, films 33-35 immediately upon being introduced into the supercooling bath 41 are formed into the film lamination 39 by contacting such films between a pair of combining rollers 42. Likewise, films 36-38 are contacted between combining rollers 43 in forming the film lamination 40. As such, upper film lamination 40 includes an outer lamina 38 composed of an oxygen barrier film, an intermediate lamina 37 composed of an EVA film having a vinyl acetate content of from approximately 30 to 40 percent and an inner lamina 36 composed of an EVA film having a vinyl acetate content of from approximately 10 to 40 percent by weight. Similarly, bottom film lamination 39 includes an outer lamina 33 composed of an oxygen barrier film, an intermediate lamina 34 composed of an EVA film having a vinyl acetate content of from approximately 30 to 40 percent by weight, or other suitable film, and an inner lamina 35 composed of a flexible polyvinylidene chloride film which forms a peelable seal with the ethylene vinyl acetate lamina 36 of the upper film lamination 40.

In the illustrated embodiment, the film lamination 39 is directed around guide rollers 45 and 46 into the package forming component 24. Similarly, the film lamination 40 is directed around guide rollers 47 and 48 into the same package forming component. Such package forming component is constructed and operated in accordance with known techniques for handling the polyvinylidene chloride films in order to provide product conforming packages therewith. A complete description of such apparatus is set forth in the coowned U.S. Letters Pat. Nos. 3,083,106 and 3,129,545, the disclosure of which are incorporated herein by reference thereto.

Individual product-enclosing packages 49 emerge from the package forming unit 24 in a chain joined by a continuous web 50. These packages can then be heated by a suitable heating element 25 to effect crystallization of the polyvinylidene chloride film. By way of example, the temperature of the polyvinylidene chloride laminae 33, 35 and 38 in the laminations 39 and 40 can be raised to approximately 150° F. for this purpose. If desired, however, such crystallization can be obtained by permitting the packages to be stored at room temperature for a prolonged period of time.

The packages upon being thus formed, are received in the combination labeling and trimming unit 26 wherein labels are applied thereto and they are separated from the web 50 which is received upon a suitable collecting roll 51. The separated packages 49a are then discharged from the unit 26 into a conveyor 52 in condition for further handling, storage, or direct shipping, if desired.

FIGS. 2 and 3 generally illustrate a package embodying principles of the present invention which is particularly suitable for packaging sliced luncheon meats and similar products. As is shown, package 61 generally includes an upper film lamination 62 drawn over a plurality of stacked luncheon meat slices 63 in intimate surface conforming configuration therewith. Upper film lamination 62 is bonded to a lower film lamination 64 through a seal area 65. In accordance with a preferred embodiment of the present invention, upper film lamination 62 includes an inner lamina 66 which is composed of an EVA film having a vinyl acetate content of from approximately 10 to 40 percent by weight. Likewise, lower film lamination 64 includes an inner lamina 67 bonded to said inner lamina 66 of said upper film lamination 62 throughout the peripheral seal area 65. Inner film lamina 67 is composed of a suitable thermoplastic film or other material which will cooperatively form a hermetic peelable seal with the EVA lamina 66. Preferably, inner lamina 67 is composed of a polyvinylidene chloride film which is contacted with said EVA film 66 while said polyvinylidene chloride film lamina 67 is in an amorphous or supercooled state. In this manner, a peelable and hermetic seal is formed between these films without the use of additional sealants or pressure-sensitive adhesive. Likewise, the use of heat, electronic, hypersonic, or equivalent sealing techniques can be eliminated when such supercooled or amorphous polyvinylidene chloride film is conjointly used with the EVA copolymer for forming the unique hermetic and peelable seal of the present invention. In this regard, however, it is important to note that the application of a controlled amount of heat to the seal area is preferred as will be more fully discussed in connection with the package forming apparatus shown in FIGS. 9 and 10.

As is best shown in FIG. 3, the upper film lamination includes an outer film lamina 68 which is preferably composed of a suitable oxygen barrier film such as, for example, a polyvinylidene chloride film having a vinylidene chloride content of approximately 85 percent and vinyl chloride content of approximately 15 percent. A suitable intermediate lamina 69 which effectively bonds the inner lamina 66 to the outer lamina 68 can be composed of an EVA film having a vinyl acetate content of from approximately 30 to 40 percent by weight and, as such, is characterized by improved bonding ability with inner and outer laminae 66 and 68. Intermediate lamina 69 also imparts improved flexibility and strength to the film lamination 62. Bottom film lamination 64 is likewise provided with a suitable intermediate lamina 70 for bonding the inner film lamina 67 to an outer oxygen barrier film lamina 71. In instances wherein the inner film lamina 67 is composed of a flexible polyvinylidene chloride film and outer lamina 71 is formed of an oxygen barrier polyvinylidene chloride film, intermediate lamina 70 can desirably be either an EVA film comparable in composition to the intermediate film lamina 69 or other suitable film such as chlorinated polyethylene and compounded polyvinyl chloride and polyvinyl chloride-vinyl acetate copolymers. Equivalent film laminae which can be substituted in place of the specific intermediate and outer laminae in the upper and lower film laminations 62 and 64 will be obvious to those skilled in this art.

In the embodiment 81 shown in FIG. 4, like reference numerals have been used to designate laminae which are identical to those shown in the FIG. 3 embodiment. Accordingly, the above description of upper film lamination 62 is incorporated herein by reference and applied to the package 81 of FIG. 4. The lower film lamination 72 can have a lamina 73 formed of any suitable relatively rigid material such as, for example, rigid polyvinyl chloride or bleached kraft paperboard having a thickness in the order of from about 0.010 to 0.020 of an inch. The upper surface of the lamina 73 can have a lamina 74 composed of a suitable thermoplastic film bonded thereto. Preferably, lamina 74 is formed of a polyvinylidene chloride film which is contacted with the inner EVA film lamina 66 of the upper film lamination 62 while in an amorphous or supercooled state so as to provide a hermetic peelable seal. While not illustrated, the bottom surface of the lamina 73 may be provided with a suitable water impermeable coating such as microcrystalline paraffin wax or the like.

FIGS. 5–8 generally illustrate a package 91 formed of a top lamination 92 and a bottom lamination 93 which cooperatively enclose therebetween a plurality of wieners or wiener-shaped products 94 in closely spaced side by side relation to each other. The film laminations 92 and 93 are combined peripherally about the product 94 to form a continuous edge seal 95. As is illustrated, the film laminations are also drawn inwardly about the products to conform to the contour thereof and provide the package 91 with a surface conforming configuration without having folds or pleats which folds or pleats could cause problem areas with respect to possible leakage and contamination.

As is best shown in FIG. 7, top film lamination 92 includes an outer oxygen barrier film 96, intermediate lamina 97 and an inner lamina 98 which, in accordance with a preferred embodiment of the present invention, is composed of an EVA film having a vinyl acetate content of from approximately 10 to 40 percent by weight. Typically, the outer film lamina 96 could be composed of a polyvinylidene chloride film having a vinylidene chloride content of approximately 85 percent and vinyl chloride content of approximately 15 percent by weight. Intermediate film lamina 97 is preferably composed of a film which will effectively bond with the outer lamina 96 and inner lamina 98. An EVA film having a vinyl acetate content of at least 30 percent is particularly suitable for this purpose since such film provides the resultant film lamination with improved strength, flexibility and desirable low-temperature properties.

Bottom film lamination 93 is likewise composed of an outer oxygen barrier film 99, an intermediate lamina 100 and inner lamina 101. In accordance with the present invention, inner lamina 101 is composed of a thermoplastic film which will form a hermetic peelable or breakaway seal with the EVA film lamina 98. Preferably, inner film lamina 101 is composed of a polyvinylidene chloride film which is contacted with said EVA film lamina 98 while in an amorphous supercooled state. If desired, however, suitable crystalline polyvinylidene chloride films and other films may be used as the inner lamina 101 and a suitable hermetic peelable seal formed therewith by the use of heat seal techniques.

In order to facilitate ready separation of the film laminations 92 and 93, inserts 102 and 103 are provided adjacent the package end 104. If desired, the inserts 102 and 103 can be formed of a suitable paper or equivalent material which can be suitably imprinted as desired. In this manner, the breakaway or peelable seal of the package illustrated in these figures is easily openable, without requiring a cutting implement.

In general, it has been observed that as the polar monomer content of an ethylene-polar monomer copolymer film is increased, the over all tackiness of the film is likewise increased. Accordingly, where the film lamina 101 in the lower film lamination 93 is composed of a less tacky thermoplastic material, it is generally preferred that the ethylene-polar monomer copolymer film lamina 98 have a correspondingly higher polar monomer content.

FIG. 9 generally illustrates one form of continuous film extruding and package forming apparatus 124 which, in accordance with an important aspect of the present invention, is equipped with means for applying controlled amounts of heat to the seal interface at the time of seal formation in order to provide the thus formed packages with a peelable or breakaway seal of improved tenacity. This apparatus generally includes a film forming component 125, supercooling bath 126, ethylene-polar monomer copolymer coating dispenser 127, package forming component 128, low-temperature seal heating means 129a and 129b, polyvinylidene chloride crystallization heaters 130a and 130b, and combination labeling and trimming unit 131. By way of illustration only, the combination film extruding and package forming apparatus 124 will generally be described in connection with the forming of packages made from a three-ply film lamination and an EVA coated oxygen barrier film.

As is shown, film forming component 125 includes a plurality of extruders, diagrammatically illustrated and respectively designated by the reference numerals 132–135. Film extruder 132 is supplied with a suitable oxygen barrier film forming resin which preferably will form a transparent film 136 having an oxygen transmission rate of from 0 to 10 cubic cm., per 100 square inches, per 24 hours, per mil thickness, at 77° F. and 760 mm. Hg, such as, for example, a polyvinylidene chloride film having a composition of approximately 85 percent vinylidene chloride and 15 percent vinyl chloride. Likewise, film extruders 133, 134 and 135 are supplied with film-forming resins which when extruded form films 137, 138 and 139, respectively. Bottom lamina or film 137 is composed of a film material which forms a peelable or breakaway seal with an EVA coating or film which has a vinyl acetate content of from approximately 10 to 40 percent by weight. In accordance with a preferred embodiment of the present invention, bottom lamina 137 is a flexible polyvinylidene chloride film, for example, a polyvinylidene chloride film having a 68 percent vinylidene chloride and 32 percent vinyl chloride content. Outer lamina 139 is a suitable oxygen barrier film, for example, a polyvinylidene chloride film having a composition of approximately 85 percent vinylidene chloride and 15 percent vinyl chloride and intermediate lamina 138 is composed of a film which will effectively bond with laminae 137 and 138 and also provide the thus formed film lamination 140 with improved strength and flexibility. For example, intermediate film lamina 138 could be composed of an EVA film having a vinyl acetate content of at least 30 percent by weight. In this connection, it should be noted that films 136–139 can be composed of different thermoplastic materials and that the specific compositions herein designated are given for illustrative purposes only.

Films 136–139 upon being extruded, are immediately introduced into a controlled temperature water bath 141 in supercooling unit 126. Water bath 141 is preferably maintained at a temperature of from approximately 35° to 100° F. When reduced to this temperature, the polyvinylidene chloride laminae 136, 137 and 139 exhibit the previously mentioned "supercooled" or noncrystalline properties. As is shown, films 137–139 upon being introduced into the water bath 141 are combined into the film lamination 140 by contacting such films between a pair of combining rollers 142. Film lamination 140 is then directed around guide rollers 143 and 144 into the package forming component 128. As is apparent from the drawing, film lamination 140 includes an outer lamina which is composed of the oxygen barrier film 139, a suitable intermediate lamina 138 and a bottom lamina 137 which when contacted with an EVA film or coating having a vinyl acetate content of from approximately 10 to 40 percent by weight will form a peelable or breakaway seal therewith.

The oxygen barrier film 136 is likewise directed around guide rollers 145, 146 and 147 to a location located just adjacent to package forming component 128 at which an ethylene-polar monomer copolymer coating 148 from dispenser 127 is deposited thereon to form a coated film 149. For purposes of illustration, this embodiment of the present invention will be described with reference to an EVA coating 148. The EVA coating 148 is applied at a location in advance of package forming unit 128 so that it will be substantially dried on the film 136 prior to package forming. If necessary, suitable drying means (not shown) can be used to facilitate drying of the coated film 149. This coating can vary in thickness, however, it will generally be in the order of 0.1 to 0.2 of a mil in thickness and has a vinyl acetate content of from 10 to 40 percent by weight. As is shown, the EVA coating is applied to the upper surface of the oxygen barrier film 136 so that it will be in position to be contacted with the bottom surface of film lamination 140 in order to provide therewith a peelable or breakaway seal.

Products to be packaged are introduced into the package forming component 128 between film lamination 140 and coated film 149 as is diagrammatically illustrated in FIG. 9. The package forming component 128 is constructed and operated in accordance with known techniques for handling the specific films employed. For example, where polyvinylidene chloride films are used, the film forming component 128 is preferably constructed and operated in the manner described in coowned U.S. Letters Pat. Nos. 3,083,106 and 3,129,545, the disclosures of which are incorporated herein by reference.

Individual product-enclosing packages 150 emerge from the package forming unit 128 in a chain joined by a continuous web 151. These packages are then introduced into the controlled seal heating means 129a and 129b. As is shown in the illustrative embodiment, controlled seal heating means 129a is in the form of a continuous die belt 152 which moves about horizontally spaced rollers or drive means 153 and 154 in a counterclockwise direction. Attached to die belt 152 are a series of spaced upper die members 155 each of which is heated by suitable means for providing controlled heating of the seal interface area. For example, in the illustrated embodiment, each of the dies 155 is connected to a flexible supply hose 156 and flexible return hoses 157. Hot water from a heated central well 158 is circulated through each of the supply hoses 156 into each of the respective die members 155 and then sent back to well 158 via return hoses 157 wherein the water is reheated prior to recirculation. If desired, electric or other suitable means can be employed for heating the die members 155 so that they will supply the seal interface area of the package with the desired amount of heat. Die members 155 are generally shaped to conform to the upper surface of each of the packages 150 and are respectively spaced so that they overlie each of the packages 150 in a closing relationship therewith as the packages 150 exit from package forming apparatus 124. The individual dies 155 are shaped in accordance with the upper contour of the packages and the interior construction thereof will depend upon the precise heat supply employed as well as on the shape of product being packaged. For example, if a plurality of wieners or wienerlike sausages were to be packaged in the apparatus 124, the respective die members 155 can be shaped as is shown in coowned U.S. Letters Pat. Nos. 3,083,106 and 3,129,545, the disclosures of which are incorporated herein by reference.

The lower radiant seal heating means 129b in the illustrative embodiment can be used to provide an additional source of heat for heating the seal interface in accordance with the present invention. In some installations, however, it will be observed that sufficient heating of the seal interface area can be accomplished from either of controlled seal heating means 129a or 129b operating alone. If desired, seal heating means 129b could be constructed in the form of a plurality of heated die members comparable to seal heating means 129a or other suitable design.

In accordance with this aspect of the present invention, the heating of the seal area is controlled in order to raise the temperature at the seal interface to a level wherein the seal tenacity is substantially improved but which does not adversely affect the breakaway property or peelability of the EVA-thermoplastic film seal. The maximum temperatures employed are below the melt temperatures of the film materials which make up the package and form the seal. Typically these temperatures will range from approximately 80° to approximately 200° F. and, as such, this heating step is readily distinguishable from conventional heat seal techniques wherein at least one of the film materials at the seal interface is heated to a temperature above its melting point in order to induce fusing thereof to the other film material making up the seal. As such, conventional heat seals are difficult to open and are not of the peelable or breakaway type which is characteristic of the present invention. Other disadvantages of conventional heat sealing are that with such techniques there is a tendency toward some extrusion or thinning of the film and distortion accompanied by a change in crystal arrangement throughout the seal area.

The individual packages 150 upon receiving this controlled heating to the seal area from seal heating means 129a and 129b are then further heated by one or more heating elements 130a and 130b in order to effect crystallization of the polyvinylidene chloride films. This heating step can, of course, be eliminated where the packaging films do not undergo the previously noted supercooling or amorphous condition. In some installations it is possible to accomplish heating of the polyvinylidene chloride film to effect crystallization and heating of the seal area to improve seal tenacity in a single step. By way of example, the temperature of the polyvinylidene chloride film 136 and polyvinylidene chloride laminae 137 and 139 in the film lamination 140 can be raised to approximately 150° F. for purpose of inducing crystallization thereof. If desired, however, such crystallization can be obtained by permitting the packages to be stored at room temperature for a prolonged period of time.

The packages upon being formed and treated in accordance with the manner described above, are then received in the combination package trimmer and labeling unit 131 wherein labels are applied thereto and they are separated from the web 151 which is received upon a suitable collecting roll 165. The separated packages 150a are then dropped from the package trimmer and labeler 131 onto a conveyor belt 166 which is driven by a suitable drive means 167 and such packages are in condition for further handling, storage or direct shipping.

FIG. 10 generally illustrates another embodiment of continuous film extruding and package forming apparatus wherein means is provided for applying controlled amounts of heat to the seal interface area of the packages 150 at the time of seal formation in order to provide the thus formed package with a peelable or breakaway seal of improved tenacity. This apparatus is generally designated by the reference numeral 175 and includes certain components which are identical to those previously described in conjunction with the apparatus 124 of FIG. 9. Accordingly, like reference numerals have been used to designate like components in apparatus 175.

The apparatus embodiment 175 shown in FIG. 10, however, includes a modified seal-heating means 176 which can be substituted for the seal-heating dies 155 of seal-heating means 129a shown and described in FIG. 9. In particular, seal-heating means 176 is in the form of a plurality of infrared heating lamps which are arranged to produce heating of the seal interface area which will result in a seal of improved tenacity without adversely effecting the peelability or breakaway property thereof. The seal-heating means 176 shown in this embodiment is particularly suitable for heating the seal interface area in products of irregular shape since it affords a convenient means by which a large and irregularly shaped seal area can be uniformly heated, such as one wherein the seal closely conforms to the contour of the irregularly shaped product (i.e., a pork chop, etc.). In this regard, it will be noted that the package forming apparatus 128 when constructed and operated as described above, will result in a vacuum having been drawn within the package so that the upper and lower films and/or film laminations will themselves be drawn about the product in a product shape conforming relationship therewith. Upon heating of the seal interface area by the infrared lamps 176 and heating element 129b to a temperature below the melt temperature of either of the film materials at the seal interface, an improved peelable or breakaway seal of the present invention will be provided. As previously noted, this seal in conforming closely to the shape of the product, affords the packaged product with a number of significant advantages. For example, the product itself will be permanently positioned within the package with little or no loose film on the package thereby substantially minimizing damage to the package during shipment which could result in product contamination. Likewise, with the packaging of food products the product shape conforming seal offers an important advantage insofar as it essentially eliminated the unsightly appearance produced by the free movement of water and product juices which would be loosely contained in the package and also minimizes the amount of residual oxygen present therein.

The use of infra-red lamps 176 alone rather than in conjunction with the heating element 129b is generally the most efficient seal heating technique employed where the product is placed upon a product board or film having a low coefficient of thermal conductivity. In this regard, however, it is possible (e.g., where the lower film lamination consists of a two or three-ply film lamination or an EVA coated film such as film 149) to supply heat to the seal area from the heating element 129b or an equivalent heat source. When paper is used as one of the constituents in the package, it is generally preferred to use a heat lamp such as the infra-red lamps 176. In some instances, a hot airstream or equivalent means can be used where it is desired to heat the seal interface area without directly contacting the packaging films with a die 155 or equivalent heated platen.

Figure 12:
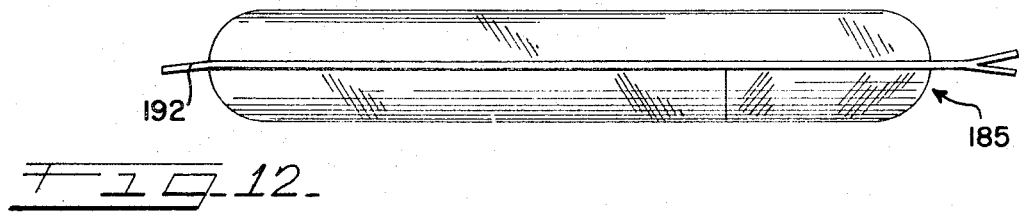
FIG. 12 is a side elevational view of the package shown in FIG. 11.
Figure 13:
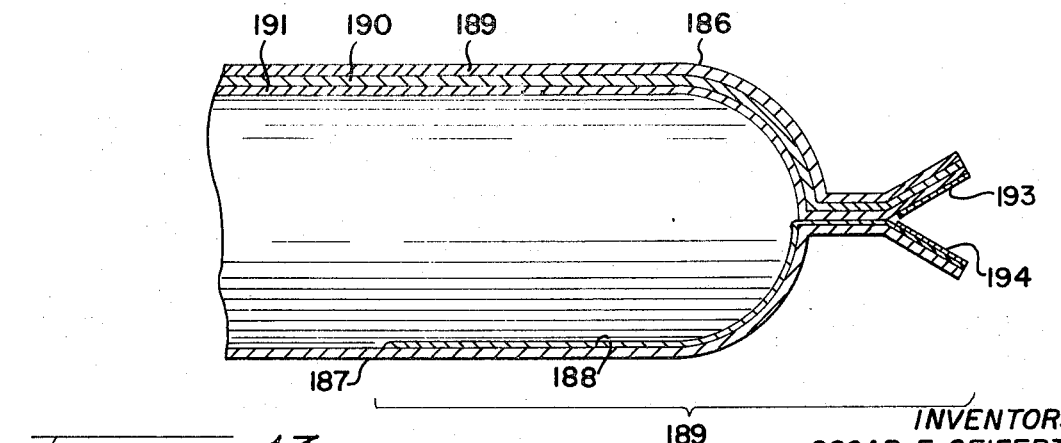
FIG. 13 is an enlarged fragmentary sectional view of the package shown in FIG. 11 taken along the line 13—13 therein.

Referring to FIGS. 11-13, a modified package 185 is shown which in the illustrated embodiment encloses a plurality of wieners or wiener shaped products in closely spaced side-by-side relation to each other. As is best shown in FIG. 13, the package 185 is formed of a top three-ply film lamination 186 and a bottom film 187 which, in accordance with a preferred embodiment of the present invention, is partially coated with an EVA coating 188 selectively applied to the portion of film 187 adjacent one end of the package; this portion of film 187 is illustrated in the drawings by the bracket 189. The seal area within the brackets 189 can be easily peeled back when access to the product is desired so as to provide a technique by which controlled access to the product is afforded and by which further seal destruction by the consumer is effectively avoided. This selective partial EVA coating 188 of film 187 facilitates resealing of the package when less than the entire contents thereof are removed.

While the specific films which form the film lamination 186 will depend upon the particular requirements of the package and the characteristics of the product being packaged, in the packaging of food products subject to oxygen deterioration, the top film lamination will generally include an outer oxygen barrier film 189, a suitable intermediate film 190, and a bottom lamina 191 composed of a thermoplastic film material which will form a breakaway or peelable seal with the EVA or equivalent copolymer coating 188 on the bottom film 187. Typically, outer film lamina 189 could be composed of a polyvinylidene chloride film having a vinylidene chloride content of approximately 85 to 90 percent by weight and a vinyl chloride content of from approximately 15 to 10 percent by weight. Likewise, film lamina 190 can be composed of any material which readily adheres to laminae 189 and 191 such as, for example, an EVA film having a vinyl acetate content of at least 30 percent by weight or other suitable film material such as chlorinated polyethylene and compounded polyvinyl chloride and polyvinyl chloride-vinyl acetate copolymer films. If desired, the inner film or lamina 191 may be composed of a flexible polyvinylidene chloride film such as one having a vinylidene chloride content of 68 percent by weight and a vinyl chloride content of 32 percent by weight.

Film 187 is preferably composed of any suitable transparent oxygen barrier film material. Typically, this film should have an oxygen transmission rate of not more than 10 cubic cm., per 100 square inches, per 24 hours, per mil thickness, at 77° F. and 760 mm. Hg. Polyvinylidene chloride films comparable in composition to upper film lamina 189 can be desirably used for this purpose.

As is shown, the top film lamination 186 and bottom film 187 are drawn about the wiener-shaped product in a surface conforming configuration therewith and are joined peripherally around the edge of the products to form a continuous edge seal 192. In order to facilitate access to the product and ready separation of the film lamination 186 from the EVA coated film 187, paper or equivalent inserts 193 and 194 can be provided adjacent the end of the package which is to be opened.

FIGS. 14 and 15 illustrate a package embodying principles of the present invention which is particularly adapted for use with a bacon product. The package 200 comprises a baseboard or member 201 which is formed of any suitably relatively rigid material such as bleached kraft paperboard which may have a thickness of from 0.01 to 0.02 of an inch. Mounted centrally on the product board 201 is a bacon product 202 which bacon product can be in the form of a plurality of stacked bacon slides that extend along the product board 201 in a inclined position. The package includes a top film lamination 203 which completely covers the product 202 and extends downwardly along the edges thereof in intimate contact therewith and then extends over the product board 201 and into sealing engagement with the exposed peripheral top surface 201a of the product board 201 and the upper surface 204a of a bottom film lamination 205 composed of an inner film lamina 204 and outer film lamina 206. Top film lamination 203 is composed of an outer film lamina 207 and inner film lamina 208. In accordance with a preferred embodiment of the present invention, a peelable or breakaway hermetic seal is provided by heaving either film lamina 204 or film lamina 208 composed of an EVA film or coating which has a vinyl acetate content of from 10 to 40 percent by weight with the remaining film lamina being composed of a suitable thermoplastic film material which provides a breakaway or peelable seal therewith. For example, top film lamination 203 can be composed of an outer oxygen barrier film such as a polyvinylidene chloride film having a vinylidene chloride content of from approximately 85 to 90 percent by weight and a vinyl chloride content of from approximately 15 to 10 percent by weight. Film lamina 208 can be composed of an EVA film having a vinyl acetate content of from approximately 10 to approximately 40 percent by weight with the vinyl acetate content of from approximately 15 to 20 percent being preferred. Film lamination 205 can include an inner film lamina 204 composed of a flexible polyvinylidene chloride film having a vinylidene chloride content of approximately 32 percent by weight while outer film lamina 206 can be composed of a suitable oxygen barrier film such as upper film lamina 207 of film lamination 203. Either of the two-ply film laminations 203 or 205 can be substituted by a single ply film having an EVA coating or a modified two or three-ply film lamination. The present invention is not limited to any specific film materials other than that one of the films at the seal interface be composed of the EVA or equivalent copolymer film which when combined with the contacting film at the seal interface provides a hermetic and peelable seal. A corner portion of the package 200 can be provided with a triangular insert 209 which is preferably formed from a material which will not adhere to the covering film lamination 203. A small corner portion of the upper film lamination 203 extends over the triangular insert 209 but is not adhered thereto, thereby enabling the upper film lamination to be readily lifted and grasped for subsequent peeling of the film from the surface of the seal interface and product when access to the package is desired.

FIGS. 16 and 17 illustrate a modified bacon package 225 which is also made in accordance with the present invention. In particular, the package 225 provides a method by which the bacon product can be packaged without the use of a rigid tray like member as shown and described in conjunction with the embodiment of FIGS. 14 and 15. In particular, the package 225 includes an upper film lamination 226 composed of an outer oxygen barrier film lamina 227 and inner lamina 228 which is composed of an EVA or equivalent copolymer film or coating having a vinyl acetate content of from approximately 10 to 40 percent by weight. As is shown, film lamination 226 extends over a bacon product 229 in conforming relationship therewith, extending along the edges of the product and outwardly therefrom in adherent contact with a bottom film lamination 230 formed of an inner lamina 231 composed of a suitable thermoplastic film which will form a peelable or breakaway seal with the EVA coating or film 228. Bottom lamina 232 of film lamination 230 is composed of a suitable oxygen barrier film of the type previously described. In accordance with a preferred embodiment of the present invention, inner lamina 228 is composed of an EVA film or coating having a vinyl acetate content of from approximately 15 to 20 percent by weight while the film lamina 231 of bottom film lamination 230 can be composed of a polyvinylidene chloride film having a vinylidene chloride content of approximately 68 percent by weight and vinyl chloride content of approximately 32 percent by weight. A suitable paper or other equivalent nonadhering insert 233 can be provided in the corner of the package to facilitate the peeling of the upper film lamination 226 when access to the product is desired.

FIGS. 18 and 19 illustrate a further modified bacon package 241 embodying principles of the present invention wherein a lower film lamination such as film lamination 205 of the embodiment shown in FIGS. 14 and 15 and film lamination 230 of the embodiment shown in FIGS. 16 and 17 can be eliminated. As is best shown in FIG. 19, the package 241 generally includes an upper film lamination 242 which can be composed of a suitable oxygen barrier film 243 and an inner lamina 244 composed of a suitable thermoplastic film which when contacted with an EVA coating or film will form a hermetic peelable or breakaway seal therewith. For example, outer film lamina 243 could be composed of a plasticized polyvinyl chloride film and inner film lamina 244 could be composed of a polyvinylidene chloride film having a vinylidene chloride content of from approximately 68 to 90 percent by weight and a vinyl chloride content of from approximately 32 to 10 percent by weight. Upper film lamination 242 covers the product 245 which in the illustrated embodiment consists of a plurality of stacked bacon slices which extend along the package as generally shown in FIG. 18. The bacon product 245 can be placed on the lower board member 246 which is generally composed of a suitable rigid member such as a foamed polystyrene board or equivalent material having a thickness sufficient to provide the package with the desired degree of rigidity. In the illustrated embodiment, polystyrene board 247 is coated on its top and bottom surfaces with polyvinylidene chloride coatings 248 and 249, respectively, with upper coating 248 being further coated with the preferred EVA coating 251 having a vinyl acetate content of from approximately 10 to 40 percent by weight. Typically, this EVA coating will be from 0.1 to 0.2 of a mil in thickness, however, this invention is not limited to any specific EVA coating thickness. Upper film lamination 242 is placed over the bacon product 245 in conforming relationship therewith by the evacuation of air from the interior of the package during package formation with a hermetic peelable or breakaway seal being formed between the EVA coating on the board and the polyvinylidene chloride or other equivalent thermoplastic material of the film 244. A portion of the bottom board member 246 can be provided with a suitable triangular insert 250 formed of a material which will not adhere to the top film lamination 242 and which enables the consumer to grasp a corner of the top film lamination 242 for gaining access to the contents of the package by easily lifting such top film lamination which will readily separate from the EVA coated board member 246.

Each of the bacon packages shown in FIGS. 14-19 can be modified in manners which will be obvious to those skilled in the art. For example, the hermetic peelable or breakaway seals thereof can be improved by heating the seal interface at the time of seal formation to a temperature below the melt temperatures of the respective film materials which make up such seals. Likewise, if desired, such packages can be formed without heating the seal interface particularly where the film which is contacted with the EVA or equivalent copolymer film or coating at the seal interface is a polyvinylidene chloride film which when contacted with such EVA film or coating is in an amorphous or supercooled condition. However, as previously noted, the concept of using a supercooled polyvinylidene chloride film and EVA or equivalent copolymer film or coating to form the seal and simultaneously providing controlled amounts of heat to such seal interface which controlled amounts of heat do not raise either of the film materials at the seal interface to a temperature above their melting points provides a preferred hermetic peelable or breakaway seal.

While certain embodiments of the present invention have been described in detail, it will be apparent that various modifications and variations thereof may be made without departing from the spirit and scope of this invention. Accordingly, only such limitations are to be imposed on this invention as are indicated in the appended claims.

We claim:

1. A package comprising a product enclosed between first and second sheets of packaging material, said first and second sheets having respective first and second sealing surfaces which are releasably adhered to each other without an adhesive layer therebetween to define a hermetic seal area which can be readily separated when access to said product is desired, said first sealing surface of said first sheet of packaging material consisting essentially of a copolymer film material formed from a mixture of ethylene and a polar monomer in which the polar monomer content is in the range of 10–40 percent by weight, and said second sheet of packaging material consisting essentially of a layer of polyvinylidene chloride copolymer film material.

2. The package of claim 1 wherein said polar monomer is selected from the group consisting of vinyl acetate, isobutyl acrylate and ethyl acrylate.

3. The package of claim 1 wherein said hermetic seal is heated to a temperature of from 80° to 210° F. at the time said ethylene-polar monomer copolymer film material was adhered to said second film layer of packaging material.

4. The package of claim 1 wherein the polar monomer content of the ethylene-polar monomer copolymer film material is from approximately 15 to 20 percent by weight.

5. A package comprising: a product enclosed between first and second sheets of packaging material, said first and second sheets having respective first and second adhering surfaces which are releasably adhered to each other without an adhesive layer therebetween to define a hermetic seal area which can be readily separated when access to said product is desired, said first adhering surface of said first sheet of packaging material consisting essentially of a copolymer film material formed from a mixture of ethylene and a polar monomer in which the polar monomer content is in the range 10–40 percent by weight, and said second adhering surface of said second sheet of packaging material consisting essentially of a layer of polyvinylidene chloride copolymer film material, said polyvinylidene copolymer chloride film material having been adhered to said ethylene-polar monomer film material while said polyvinylidene chloride copolymer film material was in an amorphous supercooled condition.

6. A package as in claim 5 wherein the first sheet includes an inner face of polyvinylidene chloride copolymer film material to which the surface of said ethylene-polar monomer copolymer film material opposite to said first adhering surface is directly bonded, and in which said second adhering surface is a polyvinylidene chloride copolymer film material formed by copolymerization of a mixture including vinylidene chloride in an amount between 68 and 90 percent and vinyl chloride in an amount between 10 and 32 percent by weight, the vinylidene chloride content of the mixture from which the polyvinylidene chloride copolymer film material of the second adhering surface is formed being lower than the vinylidene chloride content of the mixture from which the polyvinylidene chloride copolymer film material of the first sheet is formed.

7. The package of claim 5 wherein said polar monomer is selected from the group consisting of vinyl acetate, isobutyl acrylate, and ethyl acrylate.

8. The package of claim 5 wherein said hermetic seal area was heated to a temperature of from 80° to 200° F. at the time said copolymer film material was adhered to said second adhering surface.

9. The package of claim 5 wherein said first adhering surface is formed of an ethylene-vinyl acetate copolymer film material.

10. The package of claim 9 wherein said copolymer material has a vinyl acetate content of from approximately 15 to 20 percent by weight.

11. A package comprising a meat product enclosed between first and second sheets of packaging material formed about said product, in surface conforming contact therewith, said product being hermetically sealed therebetween by a hermetic seal area formed around the periphery of the product, said first and second sheets having respective first and second adhering surfaces which are releasably adhered to each other without an adhesive layer therebetween to define said hermetic seal area which can be readily separated when access to said meat product is desired, said first adhering surface of said first sheet of packaging material consisting essentially of a copolymer film material formed of a mixture of ethylene and polar monomer having a polar monomer content in the range 10–40 percent by weight, and second adhering surface of said second layer of packaging material consisting essentially of a layer of polyvinylidene chloride copolymer film material, said first and second sheets each being laminations having at least one lamina formed of an oxygen barrier film.

12. A method of enclosing a product between first and second sheets of packaging material, said method comprising the steps of: inserting a product between said first and second sheets of packaging material; contacting said first and second sheets with each other at a hermetic seal area adjacent the product around the periphery of the product, said first and second sheets having respective opposed first and second adhering surfaces at the hermetic seal area, said first sheet of packaging material having said first adhering surface consisting essentially of a copolymer film material which is bonded directly to said second adhering surface of said second sheet of packaging material without an adhesive layer therebetween at least at those portions of the seal area which are intended to be separated when access to the product is desired, said copolymer film material being formed of a mixture of ethylene and polar monomer having a polar monomer content in the range 10–40 percent by weight and said second adhering surface consisting essentially of a layer of polyvinylidene chloride copolymer film material, whereby there is formed immediately adjacent the product, a hermetic seal which completely encloses said product between said first and second sheets of packaging material.

13. The method of claim 12 wherein the first sheet includes an inner face of polyvinylidene chloride copolymer film material to which the surface of said ethylene-polar monomer copolymer film material opposite to said first adhering surface is directly bonded, and in which said second adhering surface is a polyvinylidene copolymer film material formed by polymerization of a mixture including vinylidene chloride in an amount between 68 percent and 90 percent and vinyl chloride in an amount between 10 and 32 percent by weight, the vinylidene chloride content of the mixture from which polyvinylidene chloride copolymer film material of the second adhering surface is formed being lower than the vinylidene chloride content of the mixture from which said polyvinylidene chloride copolymer film material of the first sheet is formed.

14. The method of claim 12 wherein said ethylene-polar monomer copolymer film material and the second adhering surface are heated to a temperature of from about 80° to 200° F. at the time of forming said hermetic seal by said contacting, whereby the tenacity of the seal is improved without destroying the breakaway property or peelability thereof.

15. The method of claim 12 wherein said first adhering surface is formed of an ethylene-vinyl acetate copolymer film.

16. The method of claim 15 wherein said ethylene vinyl acetate copolymer film material has a vinyl acetate content of from 15 percent to 20 percent by weight.

17. The method of claim 15 wherein said second adhering surface is formed of polyvinylidene chloride copolymer film which when initially contacted to said ethylene-vinyl acetate copolymer film material is in an amorphous supercooled state.

* * * * *